United States Patent [19]

Conachey

[11] 4,164,357
[45] Aug. 14, 1979

[54] COMBINATION INFANT AND CHILD SEAT

[76] Inventor: Eileen Conachey, 14 Cherry La., Pomona, N.Y. 10970

[21] Appl. No.: 918,916

[22] Filed: Jun. 26, 1978

[51] Int. Cl.$^2$ ............................................... A47C 1/08
[52] U.S. Cl. .................................... 297/250; 297/118; 297/466; 297/484; 297/488
[58] Field of Search ............... 297/245, 250, 254, 255, 297/256, 216, 384, 153, 352, 118, 130, 230

[56] References Cited

U.S. PATENT DOCUMENTS

| | | | |
|---|---|---|---|
| 1,739,366 | 12/1929 | Lang | 297/250 X |
| 2,720,913 | 10/1955 | Hoppert | 297/153 X |
| 2,777,502 | 1/1957 | Travis | 297/250 |
| 3,159,424 | 12/1964 | Theriault | 297/254 X |
| 3,897,104 | 7/1975 | Black | 297/118 |
| 3,934,934 | 1/1976 | Farrell et al. | 297/250 X |

Primary Examiner—James T. McCall
Attorney, Agent, or Firm—Philip Furgang

[57] ABSTRACT

Disclosed is a dual use infant and child seat intended to accommodate an infant as he grows from birth to childhood and until he is large enough to sit comfortably in a car seat. The infant seat is provided with a rectangularly-shaped and hollow storage base, which serves as a seat. The seat is completed by integrally formed arms. A fixed back is provided for receiving a child. The seat is provided with apertures positioned to receive engaging hooks and a tab member of a removable seat back. A removable seat back engages these apertures to be releasably inserted into the seat and at the front of the seat and opposite the fixed back to receive an infant. The removable seat is furnished with an integrally formed wedge-shaped member for being disposed upon the seat between the removable and fixed back so as to provide an inclination for the infant's feet to rest and be elevated. With the removable seat back in place, the infant faces rearwardly and the seat is held in place by the automobile seat belts. With the removable back removed, one of the seat apertures may be used to receive the central support post of a tray which is rested upon the infant seat arms.

A harness is provided for engaging the back of the seat and encircling the infant to hold him comfortably and securely in place.

11 Claims, 6 Drawing Figures

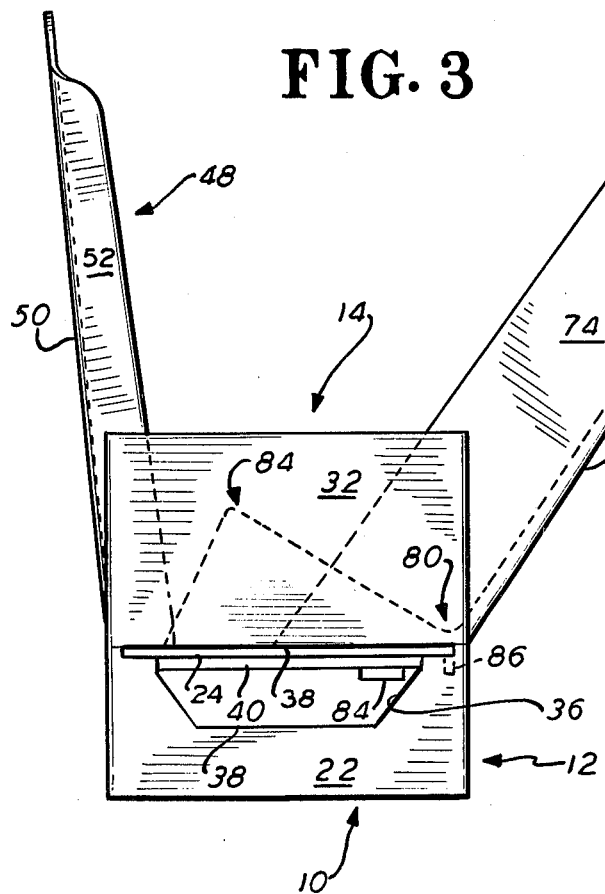
FIG. 3
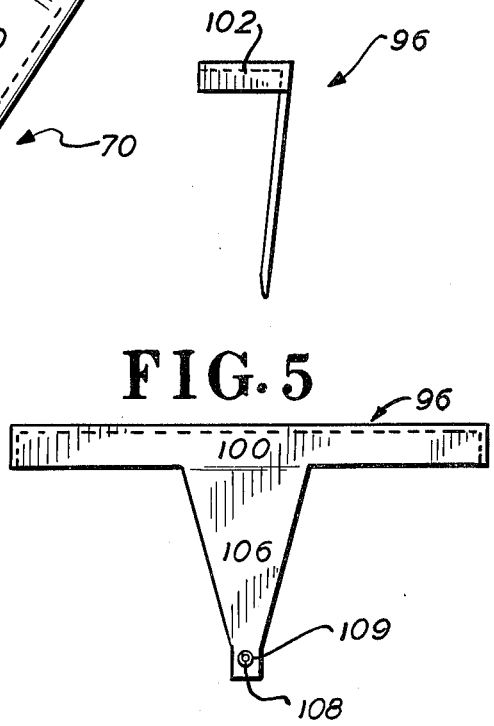
FIG. 4
FIG. 5
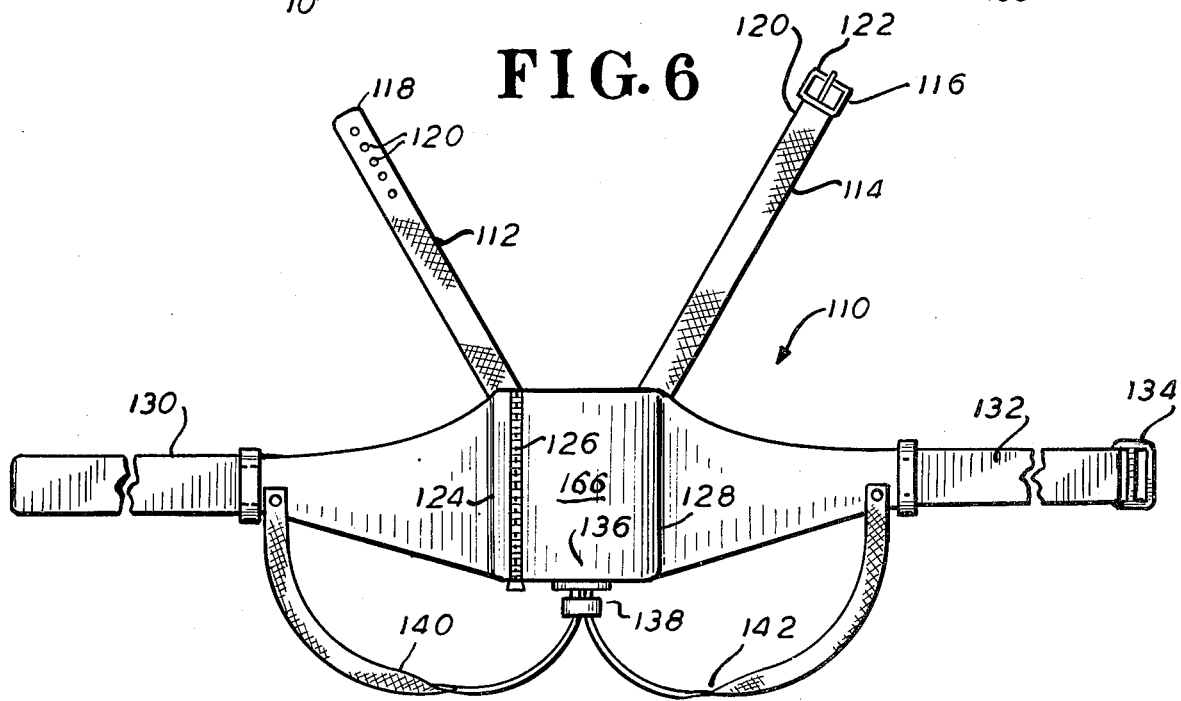
FIG. 6

COMBINATION INFANT AND CHILD SEAT

BACKGROUND OF THE INVENTION

This invention relates generally to chairs and seats of the safety padded type used for holding infants and children while riding in an automobile. The invention further relates to infant seats of the type which are positively and releasably anchored to an auto seat by use of conventional automobile safety belts.

(As used herein, the term "infant" is intended to apply to infants from birth to approximately two years of age. The term "child" is intended to apply to older children.)

It has been proposed in the prior art to utilize a self-contained infant safety seat in conjunction with the conventional auto seat for holding infants and children. Such prior art devices may encompass a general chair or seat type contour which is secured to the automobile seat by rigid hooks which fit over the back of the vehicle seat. It has also been proposed to utilize the automobile safety seat belts to secure the base of an infant-type safety seat and use a harness in conjunction with the seat to restrain the infant or child. There are other types of constraints or attachments to an automobile seat which are well known.

Some of these infant or child seats can take the form of a simple box-like construction with a folding back, such as that disclosed by Langefeld in U.S. Pat. No. 2,875,816, in which the base is used to store such implements as baby bottles or the like. Another simple device is disclosed by Post in U.S. Pat. No. 2,327,288, which, again, shows a backless, simple box seat, harness straps, and a bag attached to the seat base for storage. It is also well known to have a table top construction which may be used in conjunction with this seat. Thus, for example, Berman, in U.S. Pat. No. 3,298,735, discloses releasably attaching a table or work surface to the arms of a chair.

Other infant seat constructions are well known in the prior art and range in variety and complexity. Thus, for example, a child's car seat is disclosed by Hyde et al. in U.S. Pat. No. 3,948,556. The device is so constructed as to permit an infant to be placed in a sitting or reclining position. Ragsdale, in U.S. Pat. No. 3,596,986, discloses a baby seat which is so constructed as to mount the baby so it will sit rearwardly in the seat. Also, the interior portion of the infant seat may be removable to provide a separable and carryable baby seat.

The prior art devices are believed to be proportioned so as to comfortably accommodate infants within a restricted range of physical ages. The result is that, if a seat is proportioned so as to accept and hold an infant, as the child matures, he quickly outgrows the seat. Nevertheless, the child very often remains too small to sit comfortable on the adult-sized car seat. By contrast, if the infant seat is proportioned to accept a "child", a small infant will not be conveniently and comfortably accommodated.

None of these prior art devices, however, is so modificable as to accommodate an infant as he grows into early childhood. Thus, the use of such devices are believed to be limited to small infants, and small infants alone. Larger children must be strapped separately into a car seat, as disclosed by Dillender in U.S. Pat. No. 3,321,247.

SUMMARY OF THE INVENTION

It is an object of this invention to provide a dual use infant seat which may accommodate children of different sizes;

It is a further object of this invention to provide an infant car seat which is simple of construction, economical of manufacture, and convenient to use.

These and other objects will become more apparent from the following detailed description when taken with the drawing.

In accordance with the teachings of this invention, there is provided a combination infant and child seat of the type intended to be used in combination with an automobile seat. The infant seat includes a base housing which may be disposed upon the auto seat. The housing has a front and a back. A first back rest is secured to the back of the housing. A second back rest is removably secured to the front of the housing. The first and second back rests are so dimensioned such that with the second back rest in position, the infant may be received, and with the second back rest removed from the housing, the first back rest, in combination with the housing, being so dimensioned as to receive the child. The combination infant and child seat further includes means for securing the infant or child to the seat and to secure the infant and child seat to the automobile seat.

A BRIEF DESCRIPTION OF THE DRAWING

FIG. 3 is a side view of the infant seat of FIG. 2;

FIG. 4 is a side view of the tray as shown in FIG. 1;

FIG. 5 is a front view of the tray of FIG. 4;

FIG. 6 is a front view of the harness shown assembled with the device of this invention in FIGS. 1 and 2.

DESCRIPTION OF THE PREFERRED EMBODIMENT

Figure 1:
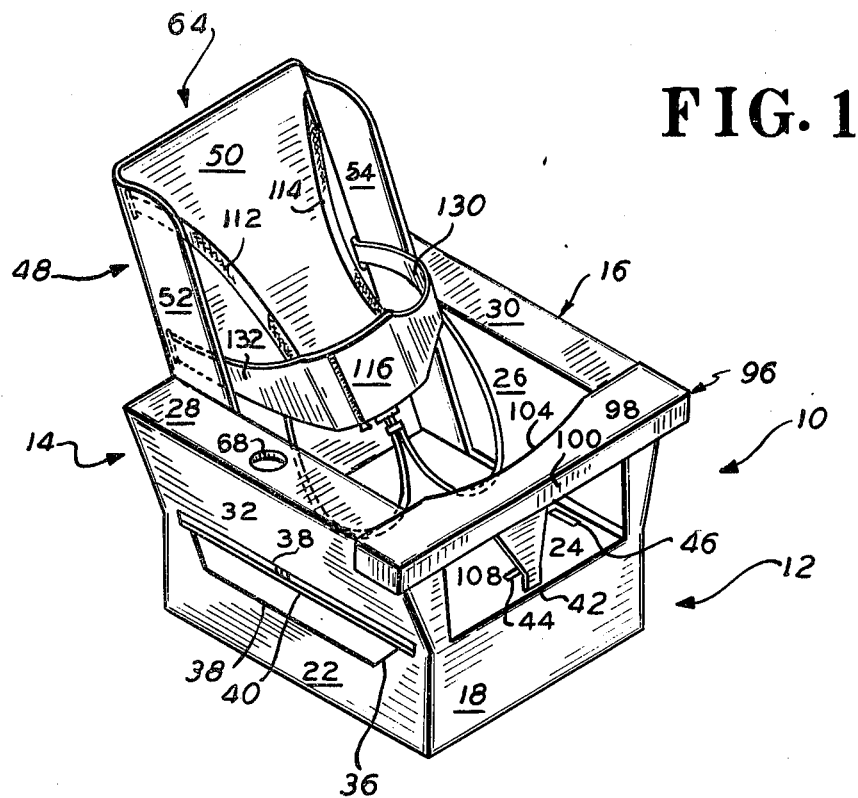
FIG. 1 is a perspective view of the infant seat with the fixed back seat in place and a tray in place.
Figure 2:
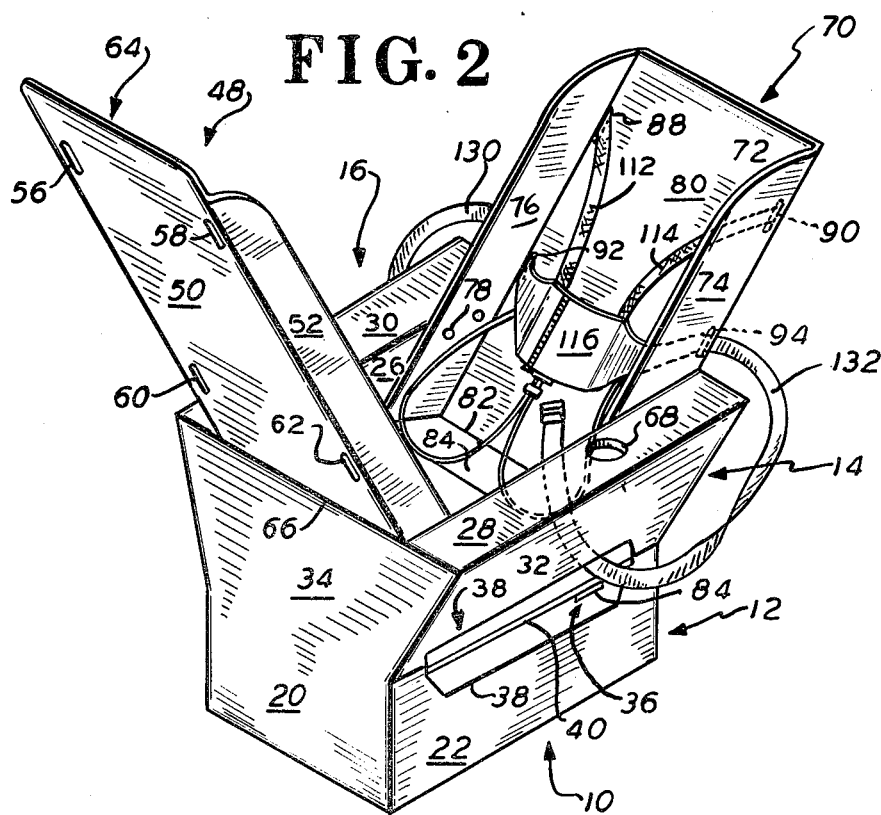
FIG. 2 is a perspective view of the seat of FIG. 1 with the removable seat back in place.

Turning now to the drawing, disclosed is an infant seat 10 (FIGS. 1-3). The infant seat 10 may be generally defined by a base 12 with integrally formed upstanding arms 14 and 16. The base 2 is defined by a generally box-like construction of a bottom wall (not visible), vertical front and back walls 18 (FIG. 1) and 20 (FIG. 2), respectively, and two side walls (only one is shown) 22. The base 12 is completed by a top wall or seat 24 (FIG. 1), which completes the box-like base 12. Extending perpendicularly to the seat 24 and spaced inwardly and parallel to the two side walls 20 are a vertical side wall 26 of each arm 14 and 16 (FIGS. 1 and 2). Extending laterally from the upper end of the arm side walls 26 are the arm resting surfaces 28 and 30 of each arm 14 and 16, respectively. The resting surfaces 28 and 30 extend outwardly beyond the side walls 22 of the box-like base 12. Each arm 14 and 16 is further defined by outer walls 32 which are canted downwardly from the arm resting surfaces 28 and 30 and terminate before the plane defined by the seat 24.

The back wall 20 of the base 12 has an upper trapezoidal part 34 for enclosing the arms and thereby providing a small back portion which structurally holds the base 12 rigidly together.

The base 12 is provided with a generally trapezoidal opening 36 along and through each side 22. The longer, parallel sides 38 of the trapezoidal opening 36 are defined in the base side wall 22 and canted side wall 32 of the arms 14 and 16. As a consequence, the edge 40 of the seat 24 is visible and a space is thereby defined between the seat 24 and the end of the side wall 32. As a further consequence of the trapezoidal opening 36, access is provided into the base 12 of the seat 10. The purpose of this opening will be more fully discussed hereinafter.

Adjacent to the front edge 42, defined by the juncture of the seat 24 with the front side wall 18 of the base, is a rectangularly-shaped slot opening 44 in the seat 24. The slot 44 is centrally disposed along the length of the edge 42. Spaced inwardly along the seat 24 from the central slot 42 and adjacent to the arms 14 and 16 may be two opposed rectangular slots 46 (one may be seen in FIG. 1). The function of the slots 44 and 46 will be more fully set out below.

The infant seat 10 is provided with a rigid, fixed seat back 48 (FIGS. 1–3). The fixed seat back 48 may be generally defined as having a planar back member 50 with wings or side panels 52 and 54 integrally formed at each side. The wings 52 and 54 are aligned and abut the side walls 26 of the arms 14 and 16, respectively. The fixed seat back 40 may be affixed to the seat base 12 as by glue, rivets, or any other well known means of attachment. The fixed seat back 48 is, preferably, disposed at an acute angle with respect to the vertical. Preferably, this angle is 5°, to provide a slightly sloping back for a sitting infant or child (not shown).

The planar back member 50 of the fixed back 48 may be provided with four rectangular apertures 56, 58, 60, and 62. Each aperture 56, 58, 60, and 62 is disposed along the sides of the planar back member 50. Thus, for example, a first pair of the slots 56 and 58 is disposed near the top 64 of the back 48 and adjacent to each side or wing 52 and 54. The other pair of slotted apertures 60 and 62 is disposed adjacent to the edge of the panel 50 near the top marginal edge 66 of the trapezoidal back 34 and adjacent to the wing members 52 and 54. The function of these slots 56, 58, 60, and 62 will be more fully discussed hereinafter.

One arm 14 of the infant seat 10 may have a circular aperture or opening 68 for a purpose which will be more fully discussed hereinafter.

The infant seat 10 may be furnished with a removable back 70 which, like the fixed back 48, comprises a rigid planar back member 72 having two wings or side members 74 and 76. While similar in configuration to the fixed back 48, the wings 74 and 76 of the removable seat back 70 are somewhat larger. The wings 74 and 76 may be furnished with snaps 78 for engaging snaps similarly disposed on the arms 14 and 16 for holding the back 70 in place. The removable back 70 further comprises a padded cushion 80, which extends along the inner side of the back member 72. This padded back 80 may be made of any well known material, such as fiber or a plastic foam, covered with a material such as plastic, vinyl, or the like. At the base 82 of the back 72, the padding 80 may be continued into a generally wedge-shaped or triangularly-shaped member 84 (shown in phantom in FIG. 3). The wedge-shaped foam member 82 may be thereby formed as an integral part of the padded back 80, being joined thereto by the covering sheet of plastic or the like.

The base of the wings 74 and 76 of the removable back 70 may be furnished with L-shaped hook-like members 84. These hook-like members 84 are insertable into the slots 46 in the seat 24 of the base 12. In addition, a central tab-like extension 86, extending from the center portion of the back 72, is so proportioned as to enter the central slot 44. The hooks 84, central tab 86, and snaps 78 hold the removable back 70 in position. The removable back 70 is preferably disposed at an angle of approximately 35° from the vertical. The purpose of these angular dispositions of the different backs 48 and 70 will be more fully discussed hereinafter.

In the same manner as the fixed back 48, the removable back 72 also has four slot-like openings 88, 90, 92, and 94 disposed in pairs along the sides of the back 72, adjacent to the wings 74 and 76. The function of these slots 88, 90, 92, and 94 will be more fully discussed hereinafter.

The infant seat 10 may also be provided with a tray 96 (FIGS. 1, 4, and 5). The tray 96 is provided with a horizontal top wall 98 (FIG. 1) and front and side vertical walls 100 and 102. The side walls 100 and 102 form a skirt about the top wall 98.

The innermost edge 104 (FIG. 1) of the top 98 may have a convex curvature so as to easily accommodate a child sitting in the seat (see FIG. 1). The side skirts 100 and 102 extend respectively along the side arms and extend on the side and in front of the infant seat 10. Extending centrally from the front skirt or wall 100 may be a central post member 106, which extends downwardly in a generally frusto conical shape, terminating in a rectangular tab 108. The tab 108 may have a snap 109 at the end thereof. The snap 109 is intended to engage a matching member on the seat 24. The central post 106 may be made of nylon or similar material to assist in preventing a child from sliding out of the seat 10 and under the tray 96 (see FIGS. 1 and 5). In use, the slot 44 and engaging snap are covered by a cushion (not shown).

The infant seat 10 may also be provided with a harness 110 (FIGS. 1, 2, and 6). The harness 110 may be generally constructed of fabric-like material, such as nylon webbing or the like, and comprises a plurality of straps. Thus, the harness 110 may be provided with a pair of shoulder straps 112 and 114. The harness 110 is provided with a rectangularly-shaped body portion 116. Each shoulder strap 112 and 114 is attached at one end to the harness body portion 116. Each shoulder strap 112 and 114 is attached at one end to the harness body portion 116. The free end 118 of one shoulder strap 112 is provided with buckle holes 120. The free end 122 of the other shoulder strap 114 is provided with a buckle 122.

The body portion 116 may be unequally divided along a vertical side 124 by a zipper 126. The function of the zipper 126 will be more fully discussed hereinafter.

Extending from the vertical sides 124 and 128 of the body portion 116 may be waist straps 130 and 132. The free end 134 of one of the waist straps 132 may have a buckle 134. The lower horizontal side 136 of the body portion 116 of the harness 110 may be furnished with a buckle member 138 of a type well known in the art. This buckle member 138 has the capability of releasably latching each part. The opposed side of the buckle member 138 has attached thereto leg straps 140 and 142, which extend from the center of the horizontal wall 136 of the body portion 116 to the waist straps 130 and 132.

In use, the seat 10 is disposed on a car seat (not shown) with the back 20 and 34 against the back seat of the car seat. Assuming for the moment that an infant of several months of age is to be disposed in the seat 10, the removable back 70 is disposed in place with the hooks 84 placed in the slots 46, and the central tab 86 inserted in the central slot 44 in the seat 24. The wedge-shaped member 82 is placed on the seat 24. The car seat belts (not shown) may be disposed about the fixed back 48 and buckled in place to hold the seat 10 firmly.

The harness 110 is placed in position with the shoulder straps 112 and 114 passed through the slots 88 and 90 at the upper part of the back 70 and buckled in back of the back 70. The waist straps 130 and 132 are passed through slots 92 and 94, respectively. Each waist strap 130 and 132 is then passed around the adjacent arm 16 and 14 and through the trapezoidal opening 36 in front of the padded cushion 80. The zipper 126 is opened to admit the infant and then zippered shut. The leg straps 140 and 142 are passed between the infant's legs, and the buckle 138 closed. The waist straps 132 and 134 are then secured across the infant. The infant is disposed against the removable cushioned seat back 70. The wedge-shaped member 82 is so disposed that the feet of the infant are in a somewhat raised position for comfort. In this position, the infant is not only comfortably seated in the seat 10, but is also facing backwards—a position considered by most safety experts as the safest position. The seat 10 is held in place by inserting the free ends of the auto seat belt through the trapezoidal opening 36 in each arm 14 and 16 and buckling the belt across the fixed back 48.

As the infant grows larger, the space between the seat backs 70 and 48 will be too small to retain the child comfortably. Nevertheless, the child will enter a period in its growth when it will still be uncomfortable for him to be seated in an adult car seat. By removing the removable car seat back 70, the infant seat 10 is left with its fixed back 48, against which the now larger child may be seated. Preferably, the removable back 70 may be used to approximately one year of age, while the remainder of the seat 48 may be used from the ages of approximately one to four or five years, depending upon how large the child is. With the removable seat back 70 removed, a child may be disposed in position against the fixed back 48 of the infant seat 10 (see FIG. 1). With the larger child disposed against the fixed back 48, the harness is assembled on the child as before (see the disposition of the harness in FIG. 1), with the shoulder straps 112 and 114 being passed through the top slots 56 and 58 and then buckled in back of the seat back 48. The waist straps 130 and 132 are passed through the lower slots 58 and 60 and buckled in back of the seat back 48. The auto seat belt again would be, as before, passed through the trapezoidal openings 36 in the arms 14 and 16 and buckled, this time, across the child, affording further protection for the child and holding the infant seat 10, as before, in place.

The tray 96 may then be placed in position with the top 98 over the arms 14 and 16 and the tab 108 in the front slot 44. The tray 96 then serves as a convenient place for providing food or a playing surface for the child.

The base member 12 of the baby seat 10 may have a generally hollow construction to serve as a storage area. The aperture 68 in the arm 14 may serve as a convenient place for inserting a baby's bottle (not shown).

The entire seat assemblage of backs 48 and 70 and base 12 may be constructed of any well known rigid material, such as a plastic or the like.

Thus, there is disclosed herein a combination infant and child seat which may accommodate infants and children not yet large enough to be accommodated comfortably in the adult car seat.

It should be noted that the removable back 70 is at a greater angle from the vertical than the fixed back 48. That is intended to better and more comfortably accommodate the infant as opposed to the larger and more mature child supported by the fixed back.

The fixed back 48 may be formed as an integral part of the back wall 20 and 34 of the seat base 12. In such a construction, the angular relationship, or tilt, of the back 48, with reference to the base back walls 20 and 34, would be the same.

What is claimed is:
1. A combination infant and child seat of the type intended to be used in combination with an auto seat, said infant seat comprising:
   (a) a base housing for being disposed upon the auto seat and having a front, back, and seat portion;
   (b) a first back rest secured to said back of said base housing;
   (c) a second back rest removably secured to said front of said base housing; said first and second back rests being so dimensioned such that, with said second back rest in position, the infant may be received and, with said second back rest removed from said base, said first back rest, in combination with said base, being so dimensioned as to receive the child; and
   (d) means for securing the infant or child to said seat and securing said infant and child seat to the auto seat.

2. A combination infant and child seat as recited in claim 1, wherein said base means comprises arms, said arms, in combination with said base, defining a seat; said first back being fixedly secured to said base.

3. A combination infant and child seat as recited in claim 2, wherein said base seat includes a seat member, said seat member having apertures therein; said second back having extending members for engaging said apertures for releasably engaging with said seat.

4. A combination infant and child seat as recited in claim 3, further comprising a wedge for being removably disposed upon said seat member; one angularly inclined side of said wedge being joined at the base thereof with the base of said second back, so as to accommodate the feet of an infant resting against said second back.

5. A combination infant and child seat as recited in claim 4, wherein said wedge-shaped member being secured to said second seat back.

6. A combination infant and child seat as recited in claim 5, wherein said means for securing the child comprises harness means, said harness means comprises shoulder and waist straps for engaging either of said seat backs to hold the child to said seat.

7. A combination infant and child seat as recited in claim 6, wherein said first seat back is fixedly secured to said base; said first seat back being inclined at an obtuse angle with respect to said seat portion of said base; with said second back releasably secured to said base housing, said second base being inclined at an obtuse angle with respect to said seat portion of said base; said obtuse angle of said second back being greater than said obtuse angle of said first back.

8. A combination infant and child seat as recited in claim 7, wherein said base further comprises side arms; said securing means comprises a flexible harness, said harness comprises straps for engaging either of said seat backs.

9. A combination infant and child seat as recited in claim 8, wherein said second seat back comprises a substantially planar back member and integrally formed wings along the length thereof; said base seat member having at least two apertures therethrough, said two apertures being disposed opposite one another and along said respective arms, adjacent to said front; said seat member further having an aperture centrally disposed between said arms and at said front; said second back wings each having a hook member, and said planar member having a depending tab, said hooks being engageable with said first and second apertures, said tab being engageable with said central aperture; said wings further comprising means for releasably engaging said arms.

10. A combination infant and child seat as recited in claim 9, wherein said base housing comprises a generally rectangular hollow member with said seat member comprising the top thereof and said arms extending thereabove; said harness comprises shoulder, waist, and leg straps, each attached to a central flexible body portion; said first and second seat backs having apertures therein, through which said shoulder and waist straps are inserted to attach said harness to said first or second seat back; said arms having an aperture therethrough, through which said waist straps may be passed; said arm aperture extending into said base such that said hollow base may be used for storage; said central body portion of said harness further comprises zipper closure means for releasably enclosing the child; said second back further comprises a padded back; said padded back comprises a continuous covering; said covering extending from said back and covering said wedge to thereby form said wedge as an integral part of said back; and a rigid tray member for being releasably engageable to said arms and disposed across said front of said base with said second back rest removed; said tray comprises a flexible member secured substantially centrally to said tray at said front and depending to releasably engage with said base so as to retain therein the child.

11. A combination infant and child seat, as recited in claim 2, further comprises a rigid tray member for being releasably engageable to said arms and disposed across said front of said base with said second back rest removed; said tray comprises a member secured substantially centrally to said tray and at said front and depending downwardly from said tray for releasably engaging with said base so as to retain therein the child.

* * * * *